United States Patent [19]

Schosek

[11] 4,299,375
[45] Nov. 10, 1981

[54] UNDERGROUND PIPE INSTALLING DEVICE

[76] Inventor: William O. Schosek, P.O. Box 3626, North Fort Myers, Fla. 33903

[21] Appl. No.: 951,626

[22] Filed: Oct. 16, 1978

[51] Int. Cl.³ .............................................. E21B 9/00
[52] U.S. Cl. ................................................ 254/29 R
[58] Field of Search ..................................... 254/29 R

[56] References Cited

U.S. PATENT DOCUMENTS 3,726,506  4/1973  Vanderwool et al. ........... 254/29 R
3,834,668  9/1974  Casey ................................. 254/29 R

FOREIGN PATENT DOCUMENTS 452650  12/1974  U.S.S.R. ........................... 254/29 R

Primary Examiner—Robert C. Watson
Attorney, Agent, or Firm—Alfred E. Wilson

[57] ABSTRACT

An underground pipe installing device comprising a T-shaped frame for positioning in a T-shaped operating trench in the ground, and which is located relative to a target trench in alignment with the intended pipe installation. The frame is suspended in the trench by a plurality of chains, and a hydraulic piston and cylinder assembly is pivotally carried by said frame. A clutch yoke carried on the extended end of the piston is adapted for selective engagement and disengagement with a push rod, employed to form a hole for the pipe. An elongated clutch operating handle and conduits from the cylinder to a hydraulic control valve extend upwardly above the ground level to provide for easy manual control of the device.

10 Claims, 5 Drawing Figures

UNDERGROUND PIPE INSTALLING DEVICE

BACKGROUND OF THE PRESENT INVENTION

To install a pipe under a finished surface such as a driveway, street, parking lot, etc., it is conventional procedure to provide operating and target trenches on opposed sides thereof and to form a hole connecting between the trenches. The pipe installing device of the present invention is suspended from chains in the operating trench and a first rod length is engaged by a clutch yoke operated by the piston of a hydraulic piston and cylinder assembly and is pushed through the ground toward the target trench by actuation of the hydraulic cylinder and piston assembly. A plurality of rod lengths are sequentially attached in an axial extending relation as the hole forming operation progresses by the sequential operation of the clutch, and hydraulic controls connected to the hydraulic cylinder.

The pushing operation continues as rod lengths are added until the leading end of the first rod length emerges into the target trench. A cap, screw threaded on the leading end for the hole forming operation, is removed and the pipe to be permanently installed is attached thereto and the operation of the clutch relative to the hydraulic cylinder and piston is reversed to pull the pipe through the formed hole until the leading end of the pipe emerges into the operating trench.

Therefore, one of the principal objects of the present invention is to provide a pipe installing device which includes a T-shaped frame as seen in top plan and means to suspend the frame in a similarly shaped but somewhat enlarged T-shaped trench.

A further object of the invention is to pivotally mount a hydraulic cylinder and piston assembly adjacent the rear end of the main longitudinally extending portion of the T-shaped frame with a clutch fork fixed to the forward extended end of the piston rod in a position for engagement with an annular shoulder on a rod length positioned below and in general longitudinal alignment with the piston and cylinder assembly.

A still further object of the invention is to provide a plurality of push rod lengths with screw thread means to permit sequential connection of the rods in an axial relation as the hole forming operation progresses, and to provide equally spaced apart annular grooves in the connected rods, defining annular shoulders for engagement by the clutch yoke, the spacing between the grooves being determined by the length of stroke of the piston rod.

Yet another object of the invention is to provide guide means to maintain the connected push rods on a true course as they are driven through and forwardly, outwardly of the device.

Another object of the invention is to provide hydraulic and clutch controls in extended positions above the ground level atop the longitudinal trench portion for easy access for manual operation thereof.

BRIEF DESCRIPTION OF THE DRAWINGS

FIG. 3 is a left end view of the device as seen in FIG. 1;

FIG. 4 is a vertical transverse sectional view taken along line 4—4 of FIG. 1.

DESCRIPTION OF A PREFERRED EMBODIMENT

Figure 1:
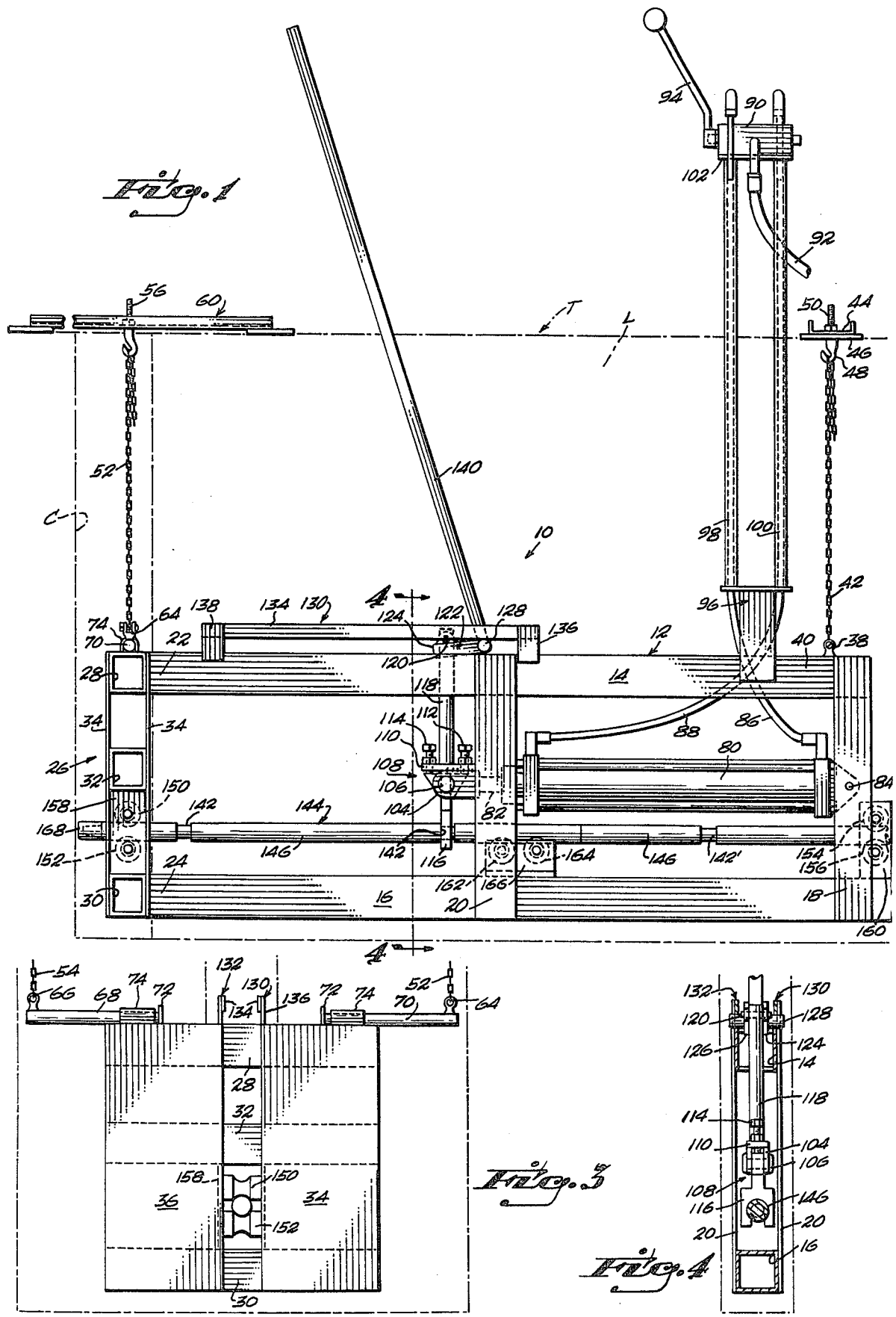
FIG. 1 is a side elevational view of the pipe installing device of the present invention, suspended in a T-shaped trench, illustrated in dot-dash lines, and with the hydraulic actuated piston in a fully retracted position.

With reference to the drawings in which like reference characters designate like or corresponding parts throughout the various views, and with particular reference to FIG. 1 the pipe installing device of the present invention, designated generally at 10, is suspended in a T-shaped trench T, comprised of a main longitudinal portion L and a cross portion C as illustrated in dot-dash lines. The main longitudinal length 12 of the device includes a frame comprised of top and bottom, generally parallel tubular members 14 and 16, interconnected by pairs of vertical parallel side plates 18 and 20, respectively, at their rear ends and intermediate their lengths.

At their forward ends 22, 24 the tubular members 14, 16 are fixed as by welding intermediate the length of a cross frame assembly 16 comprised of top, bottom and intermediate tubular frame members 28, 30 and 32 which are interconnected by pairs of forward and rear, vertically extending parallel abutment plates 34 and 36.

Means 38 is fixed relative to the top rear end portion 40 of top member 14 to anchor the bottom end of a first chain 42 and a transverse support channel 44 having a pair of foot pads 46—46 fixed to the respective ends thereof.

Figure 5:
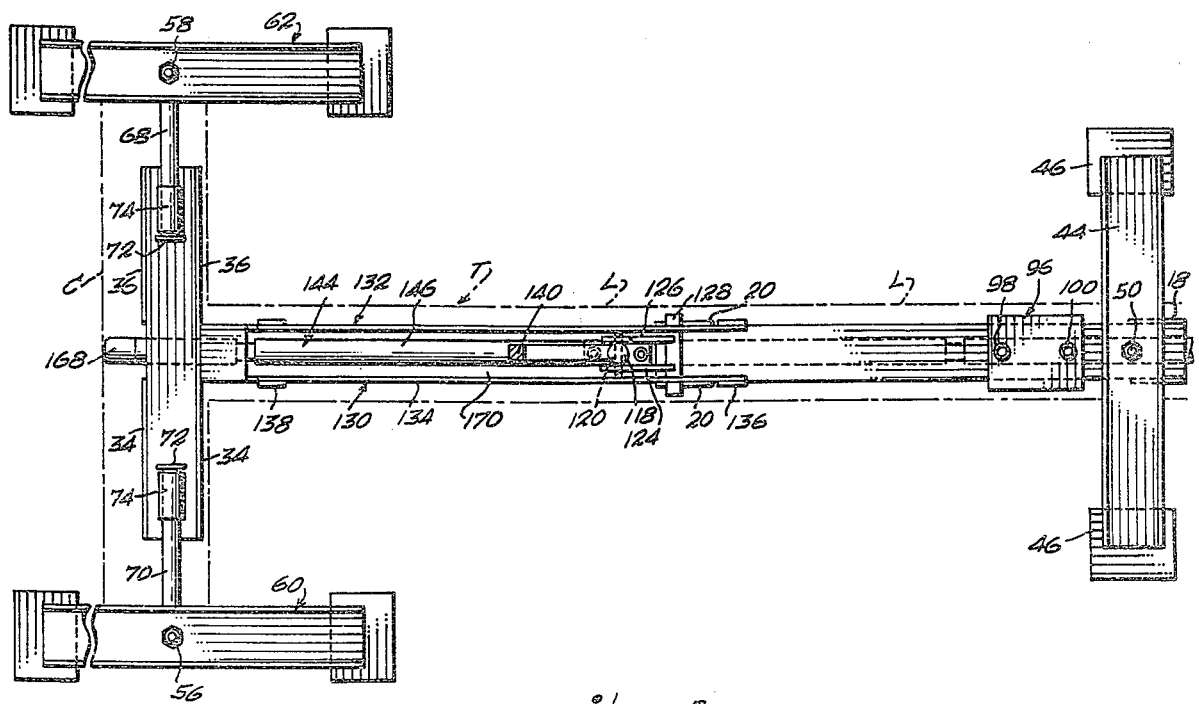
FIG. 5 is a top plan view of the T-shaped device with the T-shaped trench illustrated in dot-dash lines.

As best seen in FIG. 5, the support channel 44 is substantially longer than the width of the longitudinal trench portion L. A downwardly extending hook 48 is bolted at 50 to the central portion of support plate 44 to selectively engage any one link of chain 42 to permit depthwise adjustment of the rear end portion of the main longitudinal length 12. Second and third chains 52, 54 are similarly connected at 56, 58 to the underneath mid-portions of similar support plate and foot pad assemblies 60, 62 which longitudinally span opposed end portions of the cross trench portion C as illustrated in FIGS. 1 and 3. The lower ends of chains 56, 58 are connected at 64, 66 to outer end portions of a pair of telescopically adjustable support members 68, 70. Each member 68, 70 includes a stop plate 72 fixed to its inner end to prevent removal from its inverted U-shaped slide support member 74 as best illustrated in FIGS. 3 and 5, slide support members 74 being fixed as by welding to respective top end portions of the top cross tube frame member 28. Therefore, three substantially spaced apart support members are provided for the device 10 to obtain a desired degree of operational stability therefor. Fluid power means such as the hydraulic cylinder and piston assembly 80, 82 is pivotally attached at 84 to the rear vertical frame tube 18. A pair of hydraulic conduits 86, 88 connect between the opposed ends of cylinder 80 and a hydraulic reversing valve 90. A pressurized fluid supply conduit 92 connects to reversing valve 90 from a remote conventional source (not shown). Manually actuated handle means 94 provides for a neutral and a controlled out and in movement of piston 82 in a conventional manner.

As best illustrated in FIG. 1 an elongated support frame is provided for valve 90, whereby it is conveniently positioned well above ground level for easy access by an operator. To this end a T-plate structure 96 is fixed as by welding to top frame tube 14 adjacent its rear end, and a pair of rigid tubular members 98, 100, fixed between T-plate 96 and a top plate 102 carrying valve 90, conduct conduits 86, 88 to said valve 90.

A clevis 104, fixed to the distal end of piston rod 82, is pivotally attached at 106 to a clutch yoke assembly 108 comprised of a cross plate 110 fixed as by welding across the top of clevis 104 with a pair of set screws 112, 114 threaded therethrough to adjust the downwardly projecting attitude of a clutch yoke member 116 carried on pivot pin 106. An upwardly extending rod 118, fixed as by welding atop cross plate 110, is provided with a transverse pin 120 through its upper end. Pin 120 is pivotally connected to lever means 122 comprised of a pair of arms 124, 126 fixed as by welding to a transverse, traveling pivot rod 128.

As best illustrated in FIGS. 1 and 4, the pivot rod 128 is confined for longitudinal traveling and pivotal movements under a pair of opposed side bridge assemblies 130, 132, each of which includes an elongated longitudinal bar 134, spaced above one side edge of top tubular member 14 and vertically extending end connector plates 136, 138, fixed as by welding to said member 14. An elongated operating handle 140, fixed to traveling pivot rod 128, is angled generally upwardly relative to the lever means 122 to the general height of the control valve 90.

Figure 2:
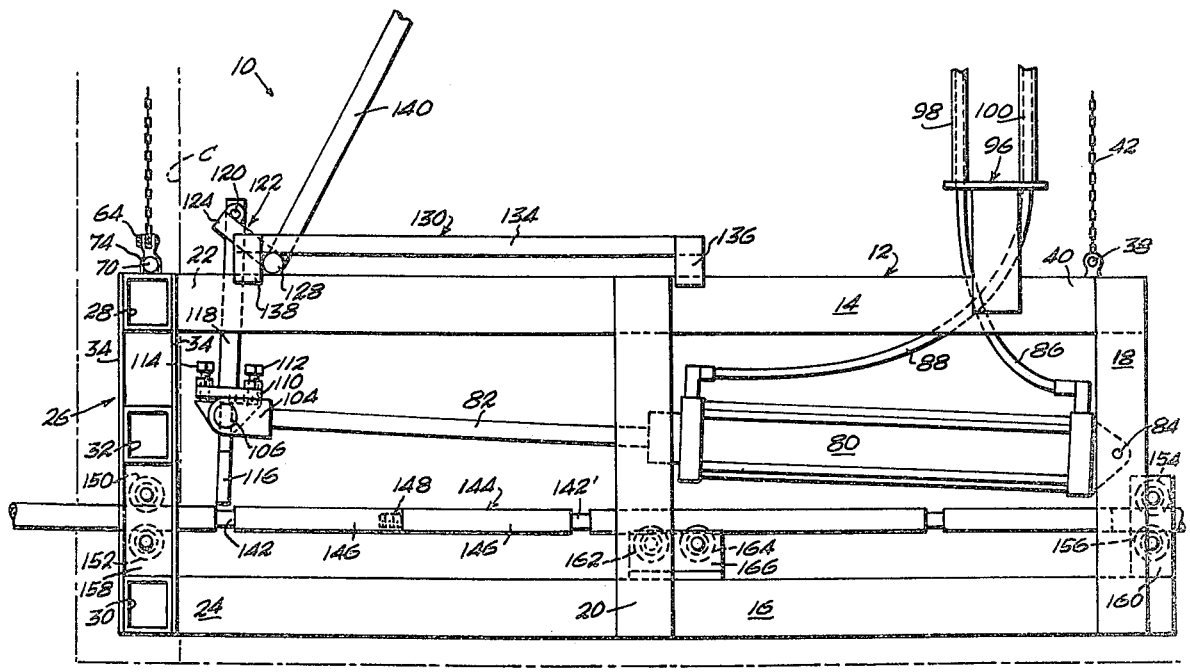
FIG. 2 is a fragmentary side elevational view similar to FIG. 1 with the hydraulic actuated piston in a fully extended position.

Therefore, it can be seen that the movement of the piston rod 84 from the "in" position of FIG. 1 to the "extended" position of FIG. 2 will not only move yoke member 116 outwardly toward the front end of the device but will also carry the operating handle 140 therealong because of the above described bridge and traveling pivot rod assemblies. Clockwise pivotal movement of operating handle 140 from the position of FIG. 1 to the position of FIG. 2 will lift the clutch yoke 116 out of engagement with an annular groove 142 in a push rod assembly 144 longitudinally disposed beneath the hydraulic cylinder and piston assembly 80, 82.

The push rod assembly 144 is comprised of a plurality of axially connected push rod section lengths 146 as by the endwise threaded connection 148, illustrated in FIG. 2.

Push rod assembly 144 is confined to a precise line of travel by front and rear pairs of upper and lower guide rollers 150, 152 and 154, 156 rotatably mounted between respective pairs of side plates 158 and 160, one of each being illustrated in FIGS. 1 and 2.

Push rod assembly 144 is centrally controlled adjacent the clutch yoke 116 by a pair of bottom guide rollers 162, 164, rotatably journalled in a pair of side angle plates 166, one illustrated, fixed to bottom frame tube 16.

In operation, with a push rod assembly disposed in place as illustrated and with clutch control handle 140 positioned as in FIG. 1 to engage clutch yoke 116 in an annular groove 142, the hydraulic control handle 94 is actuated to cause the piston 82 to move outwardly to the position of FIG. 2. This operation pushes the rod assembly 144 through the trench wall as in FIG. 2 toward the target trench (not shown). The front end of the push rod assembly is capped as at 168 for the hole forming operation.

When the piston rod 82 is fully extended, the clutch handle 140 is actuated to the position illustrated in FIG. 2 to tilt the hydraulic cylinder and piston assembly 80, 82 and to disengage the clutch yoke 116 from the annular groove 142. Thereupon, the fluid flow to the hydraulic cylinder is reversed by operation of a valve handle 94 to withdraw the piston 82. The handle 140 is actuated back to the piston of FIG. 1 to engage the next succeeding annular groove 142', FIG. 2.

The above operation is repeated until the capped end 168 emerges into the target trench (not shown). After removal of cap 168 the pipe to be installed is connected to the end of the push rod assembly 144 in place of the cap 168 in a conventional manner, and the operation of the clutch yoke is reversed to pull the pipe (not shown) from the target trench to the operating trench T. That is, the clutch yoke 116 is engaged in the annular groove 142 in the position illustrated in FIG. 2 and the piston 82 is operated to the retracted position, whereupon, the clutch yoke 116 is disengaged and actuated back to the FIG. 2 extended position and the pulling operation continues as above described.

Normally, several axially connected rod lengths 146 may be initially inserted in the device 10 to start the hole forming operation and an enlarged trench portion (not shown) is provided in back of the longitudinal trench portion L to permit an operator to continually axially thread rod lengths to the trailing end of the push rod assembly 144 as needed until push rod assembly 144 emerges in the target trench.

The front and back abutment plates 34, 36 sequentially support the device against the front and back walls of the cross trench C during the forward and reverse thrusts generated by the pushing and pulling operations of the piston and cylinder assembly 80 and 82, and appropriate slot means 170, FIG. 5, are provided in top tube 14 to permit the reciprocating movements of the vertical rod 118.

I claim:

1. A device for installing an underground pipe between two specific spaced apart points defined during the installation operation by an operating trench and a target trench spaced from the operating trench comprising a frame including a longitudinal section having a central portion and transversely extending front and back portions for insertion into the operating trench which is companionately shaped relative to said frame on a somewhat enlarged scale,
  means to adjustably mount said frame in the operating trench,
  a push rod assembly comprising a plurality of push rod lengths endwisely removably screw threaded together in axial alignment extending longitudinally through said longitudinal frame portion,
  reciprocating drive means including a cylinder and piston combination carried in said longitudinal portion of the frame to selectively drive said push rod assembly forwardly and rearwardly relative to said longitudinal portion of the frame,
  clutch means connected to said drive means,
  manual control means for selective sequential engagement of said clutch means with said push rod assembly in a first position to cause successive lengths of said push rod assembly to be sequentially pushed forwardly through the soil from the operating trench to the target trench, and reversing means associated with the clutch and operable in a second position to cause said push rod assembly to be sequentially pulled rearwardly from the target trench to the operating trench,
  a plurality of separately operable screw threaded means to vary the vertical position of the frame in the operating trench and to adjust the horizontal angularity of the frame.

2. The device as defined in claim 1 wherein said push rod assembly includes a plurality of spaced apart reduced diameter grooves along its length, said spacing being determined by the stroke of said piston.

3. The device as defined in claim 2 wherein said clutch means comprises a clutch yoke carried by an extended distal end of said piston rod for selective engagement and disengagement with said grooves.

4. The device as defined in claim 3 wherein said hydraulic cylinder is pivotally connected at a rear end thereof to said frame back end.

5. The device as defined in claim 4 wherein said manual control means includes an upstanding rod, fixed at a lower end relative to said clutch yoke and extended distal end, and lever means operably engaged with an upper end of said upstanding rod and being movable between a down position to engage said clutch yoke in one of said grooves when said groove is aligned therewith and an up position to disengage said clutch yoke from said aligned groove.

6. The device as defined in claim 5 wherein said manual control means further includes an elongated, generally upwardly extending manually operated clutch handle connected to said lever and including pivot means whereby said lever may be pivoted between said down and up positions by proper manipulation of said handle.

7. The device as defined in claim 6 including a hydraulic reversing valve connected between a remote conventional source of a pressurized hydraulic fluid supply and opposed ends of said hydraulic cylinder, and a manually operated lever connected to said reversing valve to selectively operate same from a neutral position to selective positions to reciprocally operate said piston rod between fully extended and retracted positions whereby said clutch yoke when engaged in one of said grooves in a retracted position may be actuated to drive said push rod assembly outwardly toward said target trench, and when engaged in one of said grooves in an extended position may be actuated to withdrawn said push rod assembly from said target trench toward said operating trench.

8. The device as defined in claim 7 including means to permit reciprocating movement of said pivot means in a straight line of travel, parallel to said push rod, in unison with said reciprocating movement of said piston rod.

9. The device as defined in claim 8 wherein said means to permit comprises a bridge means fixed atop said longitudinal portion defining a slot therebetween to slidably journal said pivot means.

10. The device as defined in claim 7 wherein said manually operated clutch handle extends upwardly to a predetermined distance above ground level, and said reversing valve and manually operated lever are similarly located above ground level.

* * * * *